O. TRACY.
Axle.
No. 4,889
Patented Dec 12, 1846.
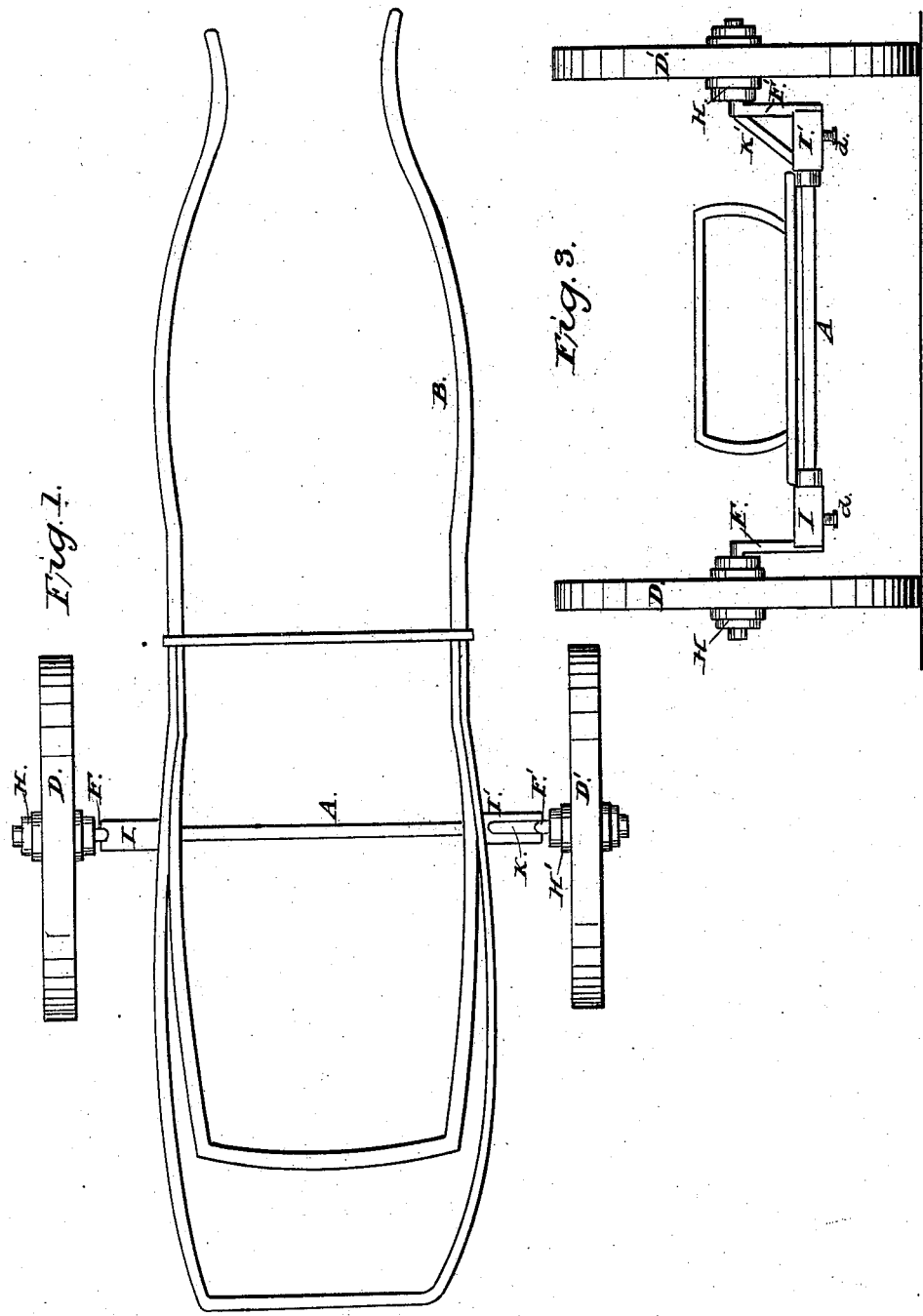

2 Sheets—Sheet 2.
O. TRACY.
Axle.
No. 4,889. Patented Dec. 12, 1846.
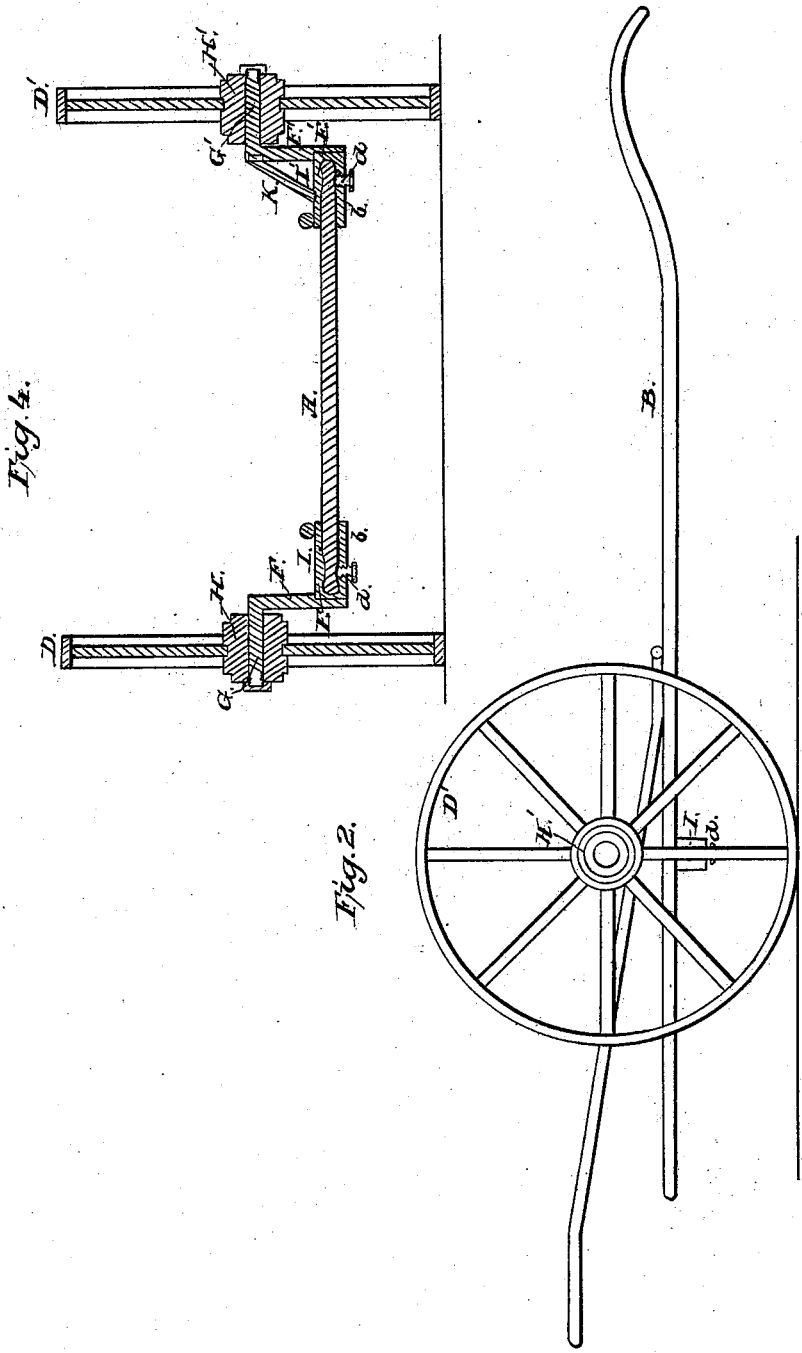

UNITED STATES PATENT OFFICE.

OREN TRACY, OF FITCHBURG, MASSACHUSETTS.

AXLE FOR CARRIAGES.

Specification of Letters Patent No. 4,889, dated December 12, 1846.

*To all whom it may concern:*

Be it known that I, OREN TRACY, of Fitchburg, in the county of Worcester and State of Massachusetts, have invented a new and useful Improvement which I term the "Improved Crank-Axle for Wheel-Carriages;" and I do hereby declare that the nature of my invention and the manner in which it operates are fully described and represented in the following specification and accompanying drawings, letters, figures, and references thereof.

Of the said drawings Figure 1 denotes a top view of the shafts and running part of a common chaise or phaeton. Fig. 2 denotes a side elevation. Fig. 3 a rear end elevation, and Fig. 4 a vertical and transverse section taken through the axletree and the hubs of the wheels.

My improvement consists in combining with the crank of a cranked axletree, a pipe box or bearing whereby it may be readily adapted to fixed axletrees or such as are in common use on ordinary carriages.

In the aforesaid drawings A denotes the axletree of a chaise B, B' the shafts—D, D' the wheels—E, E' the journals of the axletree.

F F' are the cranks applied to the axle A, and having journals G, G', which respectively pass through the hubs (H, H') of the wheels, as seen in the drawings. To the crank F or F' I affix at right angles or thereabout a pipe box or bearing I or I' made to fit and travel upon the journals E or E' and confined thereon either by a screw (*a*) passing through it, and entering a groove *b* made in, and around the journal, or by any of the modes usually adopted for confining the hub of a carriage wheel to the journal of its axletree.

The crank F I sometimes support by a diagonal or inclined brace K extending from the rear end of the top of the pipe box, to the upper part of the arm of the crank as seen in the drawing. This I use for heavy carriages. For those of light draft it will not be necessary.

By my improvement the crank axle may be readily adapted to any carriage having fixed axletrees, and may be put on and taken off, in the same manner as a wheel is affixed to or removed from its axle.

There are various forms and shapes on which the said crank axle and pipe box may be made and applied to each other, and there may be various modes adopted of applying and securing them to the axletree, and the wheels, and still preserve the principle of my invention. I do not intend to describe them as they will be readily understood by carriage builders, and are only so many variations of construction without any change of invention; I therefore wish it to be distinctly understood that I consider my invention to rest upon the aforesaid improved cranked axletree, whereby I make use as it were, of an additional axletree and pipe box (and either with or without the brace above mentioned) in adjusting each wheel to the carriage.

I therefore claim—

The additional pipe box I in combination with the crank of the axle, and either with or without the brace K, the whole being arranged, constructed and operating substantially in manner and for the purpose as herein above specified.

In testimony whereof I have hereto set my signature this seventeenth day of October, A. D. 1846.

OREN TRACY.

Witnesses:
CHARLES MASON.
LORIN BROWN.